US006390383B1

(12) United States Patent
Fusaro, Jr. et al.

(10) Patent No.: US 6,390,383 B1

(45) Date of Patent: May 21, 2002

(54) STAGED FEED ROBOTIC MACHINE

(75) Inventors: Robert Anthony Fusaro, Jr., Cobleskill; Russell Stephen DeMuth, Berne, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/629,212

(22) Filed: Jul. 31, 2000

(51) Int. Cl.[7] .......................... A01G 27/00; B05B 15/08

(52) U.S. Cl. ............................ 239/69; 239/79; 239/85; 239/587.1; 901/43; 901/46; 118/326

(58) Field of Search ............................ 239/69, 79, 85, 239/379, 587.1; 901/41, 42, 43, 46; 118/326

(56) References Cited

U.S. PATENT DOCUMENTS 4,613,082 A * 9/1986 Gimple et al. ............ 901/43 X
4,704,298 A * 11/1987 Herman et al. ............ 118/326
5,358,397 A * 10/1994 Ligon et al. .................. 901/46
5,363,556 A * 11/1994 Banholzer et al. ...... 239/379 X
5,690,844 A 11/1997 White et al.
6,068,201 A * 5/2000 Hawley et al. ............... 239/69

* cited by examiner

*Primary Examiner*—Steven J. Ganey
(74) *Attorney, Agent, or Firm*—Noreen C. Johnson; Christian G. Cabou

(57) ABSTRACT

A robotic machine includes a robotic arm with a machine tool mounted thereto. A powder injector is mounted near the tool. A local powder feeder is mounted to the arm and includes a local conduit for supplying powder to the injector, and a load cell for measuring powder weight therein to control feedrate. A remote powder feeder is spaced from the arm, and includes a remote conduit joined to the local feeder for supplying powder thereto. A process computer controls the arm, and two feeders and effects staged delivery of the powder from the remote feeder to the local feeder for improving powder delivery response time.

18 Claims, 2 Drawing Sheets

STAGED FEED ROBOTIC MACHINE

BACKGROUND OF THE INVENTION

The present invention relates generally to robotic machine tools, and, more specifically, to powder feed therein.

Robotic machine tools exist in various configurations for performing various manufacturing operations in the production of various machine components. A typical computer-controlled multi-axis machine is programmed to follow a predetermined path over the contours of a three dimensional workpiece. The workpiece may require precise welding at specific locations on its contour, or may require precise coating of its surface, for example.

In one exemplary configuration, a plasma torch or gun is mounted to the distal end of an articulated robotic arm having multiple degrees of movement such as translation or rotation or both. The machine may be programmed to aim the plasma gun toward the surface of the workpiece and follow a programmed path for automatically plasma spraying the workpiece with a suitable powder material.

For example, the workpiece may be a gas turbine engine stator vane having a complex 3-D contour requiring the deposition of a thermal barrier coating thereon by plasma spraying. In order to plasma spray a uniform coating over the entire surface of the workpiece, the plasma gun must follow a precise spraying path while depositing precise a layer of material.

The plasma spray coating is initially provided in powder form from a powder feeder joined to the plasma gun by a supply tube or conduit. The conduit must be long and flexible for permitting for permitting full multi-axis motion of the robotic arm without restraint or entanglement, and therefore introduces a substantial delay or lag in response time as powder feed rates are changed during operation.

Powder feeders are commercially available in various forms including integral controllers which permit setting of the desired powder feedrate therefrom. A common process control computer may be operatively joined to both the powder feeder and robotic machine for controlling operation thereof.

Since a change in powder feedrate communicated to the powder feeder introduces a time lag before the change in feedrate is effected at the end of the long supply conduit terminating at the plasma gun, the plasma spraying operation must be temporarily slowed or interrupted until a change in the feedrate has stabilized. This reduces the efficiency of the plasma spray operation and may affect the uniformity of the deposited plasma spray coating.

Accordingly, it is to provide a robotic machine having improved response time for changes in powder feedrates.

BRIEF SUMMARY OF THE INVENTION

A robotic machine includes a robotic arm with a machine tool mounted thereto. A powder injector is mounted near the tool. A local powder feeder is mounted to the arm and includes a local conduit for supplying powder to the injector, and a load cell for measuring powder weight therein to control feedrate. A remote powder feeder is spaced from the arm, and includes a remote conduit joined to the local feeder for supplying powder thereto. A process computer controls the arm, and two feeders and effects staged delivery of the powder from the remote feeder to the local feeder for improving powder delivery response time.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
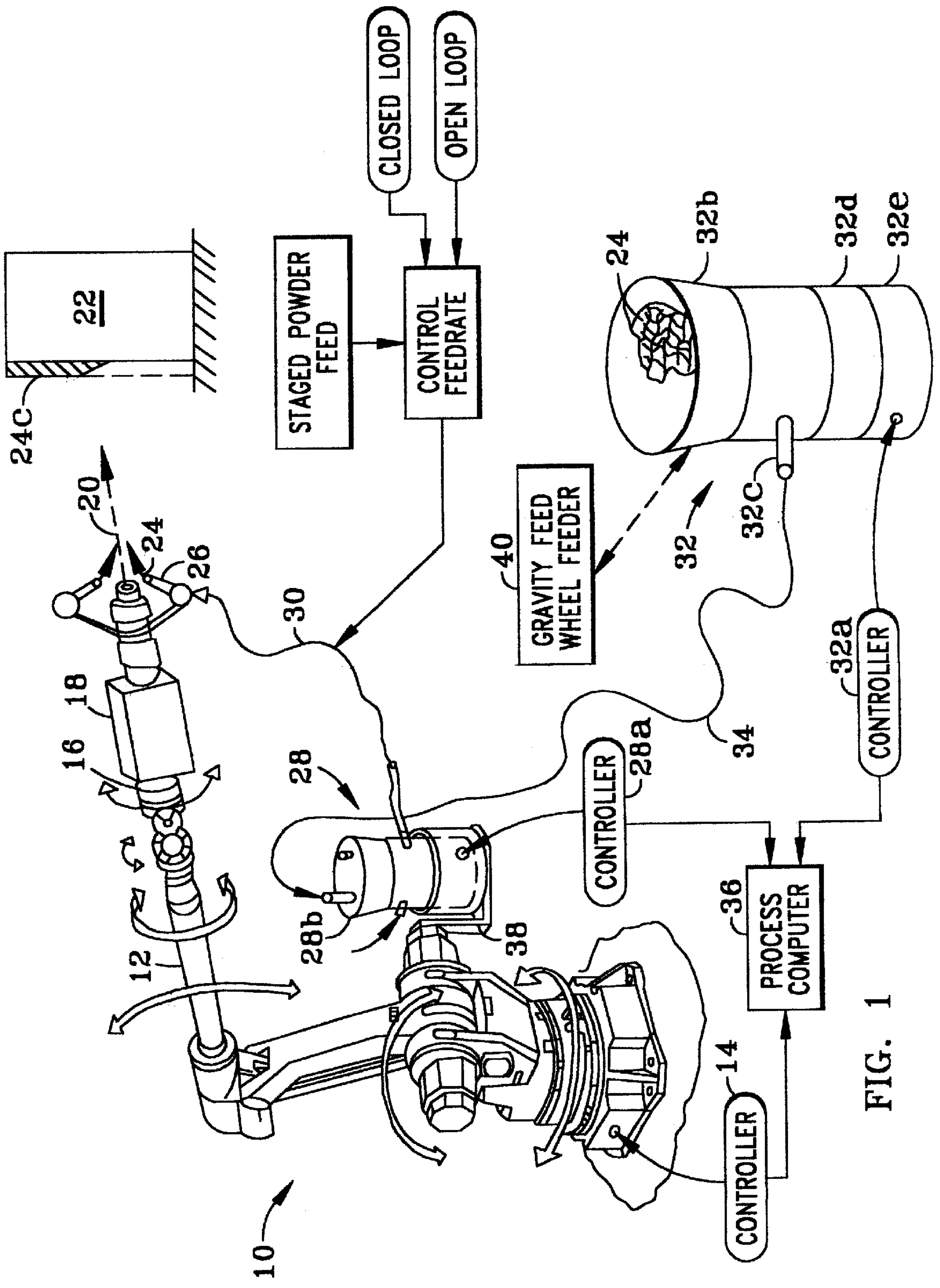
FIG. 1 is a schematic representation of a multi-axis machine tool configured for plasma spraying a workpiece in accordance with an exemplary embodiment of the present invention.

Illustrated schematically in FIG. 1 is a robotic machine 10 including a multi-axis articulated arm 12 whose position is operatively controlled by a programmable controller 14. The machine 10 may have any conventional configuration for performing various machining operations as desired including welding and plasma spraying, for example. Such machines are commonly referred to as computer numerical control (CNC) or digital numerical control (DNC) machines in which their various machining operations may be programmed in software, and stored in suitable memory within the controller for automatic operation thereof.

In the exemplary embodiment illustrated in FIG. 1, the robotic arm 12 is articulated at several joints to effect six axes of movement of a mount 16 disposed at the distal end of the arm. The corresponding six degrees of movement are all rotary as indicated by the six double headed arrows illustrated in FIG. 1.

A machine tool 18 in the exemplary form of a plasma spray gun is removably supported in the mount 16. The plasma gun includes a main body which is suitably water cooled, and removably mounts a plasma spray nozzle thereto. The gun is provided with a plasma gas and is suitably powered for discharging a hot plasma 20 from the nozzle during operation.

The machine 10 further includes a mounting table on which a workpiece 22 may be suitably mounted. In the exemplary embodiment, the mounting table introduces two additional degrees of movement including rotation of the table and tilting thereof which when combined with the six degrees of movement of the robotic arm 12 effect a total of eight degrees of movement between the arm and table. In this way, the plasma gun 18, and in particular its plasma nozzle, may be directed at any location over the exposed surface of the workpiece 22 mounted to the table.

The robotic multi-axis machine described above and the workpiece may have any conventional configuration. For example, the workpiece may be in the exemplary form of a gas turbine engine turbine vane which has an airfoil contour including a generally concave pressure side and a generally convex opposite suction side extending longitudinally from root to tip between leading and trailing edges of the vane.

Since the vane is subject to hot combustion gases during operation in a gas turbine engine, it is desired to coat the vane with a ceramic thermal barrier coating 24*c* which is applied using plasma spray deposition effected by the plasma spray gun 18.

The coating 24*c* after plasma deposition and cooling is solidified in a unitary mass. However, the coating material is initially in the form of a loose powder 24 which is injected into the hot plasma from one or more powder injectors 26 suitably mounted to the robotic arm, typically at the nozzle end of the plasma gun 18.

In accordance with the present invention, the robotic machine is provided with a staged powder feed system to substantially improve response time over the response time of a system having a relatively long supply conduit with a correspondingly long lag in response time as powder feedrates are changed. More specifically, a first or local powder feeder 28 is preferably mounted to a suitable portion of the robotic arm 12, and includes a first or local flexible conduit 30 joined to the one or more powder injectors for supplying powder thereto.

A second or remote powder feeder 32 is suitably spaced remotely from the robotic arm, and includes a second or remote flexible conduit 34 joined to the local feeder 28 for supplying the powder thereto.

The two feeders 28,32 may be conventional, and in commercially available form include respective electrical controllers 28*a*,32*a* which control operation thereof including the desired powder feedrates therefrom. A central process control computer 36 is operatively joined to the controller 14 of the robotic arm 12 and the corresponding controllers of the local and remote feeders 28,32 for controlling the collective operation thereof.

The process computer 36 may have any conventional form and cooperates with the robotic controller to control its multiple degrees of movement for positioning the plasma gun 18 as desired for directing the hot plasma and injected powder over the outer surface of the workpiece 22. The process computer is also programmed to control the supply of powder to the powder injector 26 in stages from tie local and remote feeders 28,32 in turn or sequentially.

The local feeder 28 includes a local hopper 28*b* sized for temporarily storing and supplying the powder to the local conduit 30 as required for the specific powder injection operation. Correspondingly, the remote feeder 32 includes a remote hopper 32*b* for storing and supplying die powder 24 to the remote conduit 34 as required for replenishing powder as it is depleted from the local feeder. The local hopper 28*b* is preferably relatively small and is sized smaller than the remote hopper 32*b* which is sized substantially large for containing a sufficient batch of the powder for completing a desired plasma spray process of coating one or more of the workpieces 22 without interruption.

A particular advantage of using the two feeders 28,32 is the ability to stage delivery of the powder and improve response time as powder feedrates are changed during operation, with the response time being optimized where the local conduit 30 is sized in length as short as possible, and typically considerably shorter than the longer remote conduit 34 which extends to the remote feeder 32 located at any suitable distance from the robotic arm to prevent interference therewith during operation.

An improved method of operating or using the robotic machine illustrated in FIG. 1 is illustrated schematically in flowchart form therein and includes channeling the powder from the remote feeder 32 to the local feeder 28 in stages to ensure that the local feeder has sufficient powder therein at all times to feed the powder injector 26. Then by controlling the feedrate of the powder discharged from the local feeder 28 to the injector 26 the response time for effecting changes in feedrate is substantially improved.

When the process computer 36 directs a change in feedrate through the controller of the local feeder 28, the change in feedrate experienced at the injector 26 is relatively fast in view of the relatively short length of the local conduit 30 through which the powder is channeled. Since powder response time is directly related to the length of the conduit through which it is channeled, the shorter the conduit the faster the response time will be.

However, since the plasma gun 18 is attached to the distal end of the robotic arm 12, the local feeder 28 and local conduit 30 must be suitably located to prevent restraint or obstruction of the arm as it moves within its full permitted range of motion.

In the exemplary embodiment illustrated in FIG. 1, the local feeder 28 is preferably mounted vertically in a suitable carriage or mount 38 to the proximal end or base of the robotic arm 12 for being carried thereby during operation. And, the local conduit 30 is sized in length to permit full multi-axis motion of the arm distal end supporting the plasma gun 18 without restraining or obstructing movement thereof In this way, the local conduit 30 may be relatively short for improving the powder feed response time from the locally mounted local feeder 28.

In the exemplary embodiment illustrated in FIG. 1, the robotic arm 12 is commercially available in various forms, with the illustrated embodiment having six sequential rotary axes. The second rotary axis from the stationary base of the robotic arm is effected by a corresponding motor having a non-rotating case to which the feeder mount 38 may be conveniently attached. The local feeder therefore experiences only the horizontal rotary movement of the first axis of rotation of the arm and remains vertical or upright at all times.

However, the feeder mount 38 may be in form of a gimbal mount for permitting the feeder to be mounted at other locations on the articulated arm even closer to the plasma gun 18 while maintaining its vertical or upright orientation for effective operation of the powder feeder itself.

Figure 2:
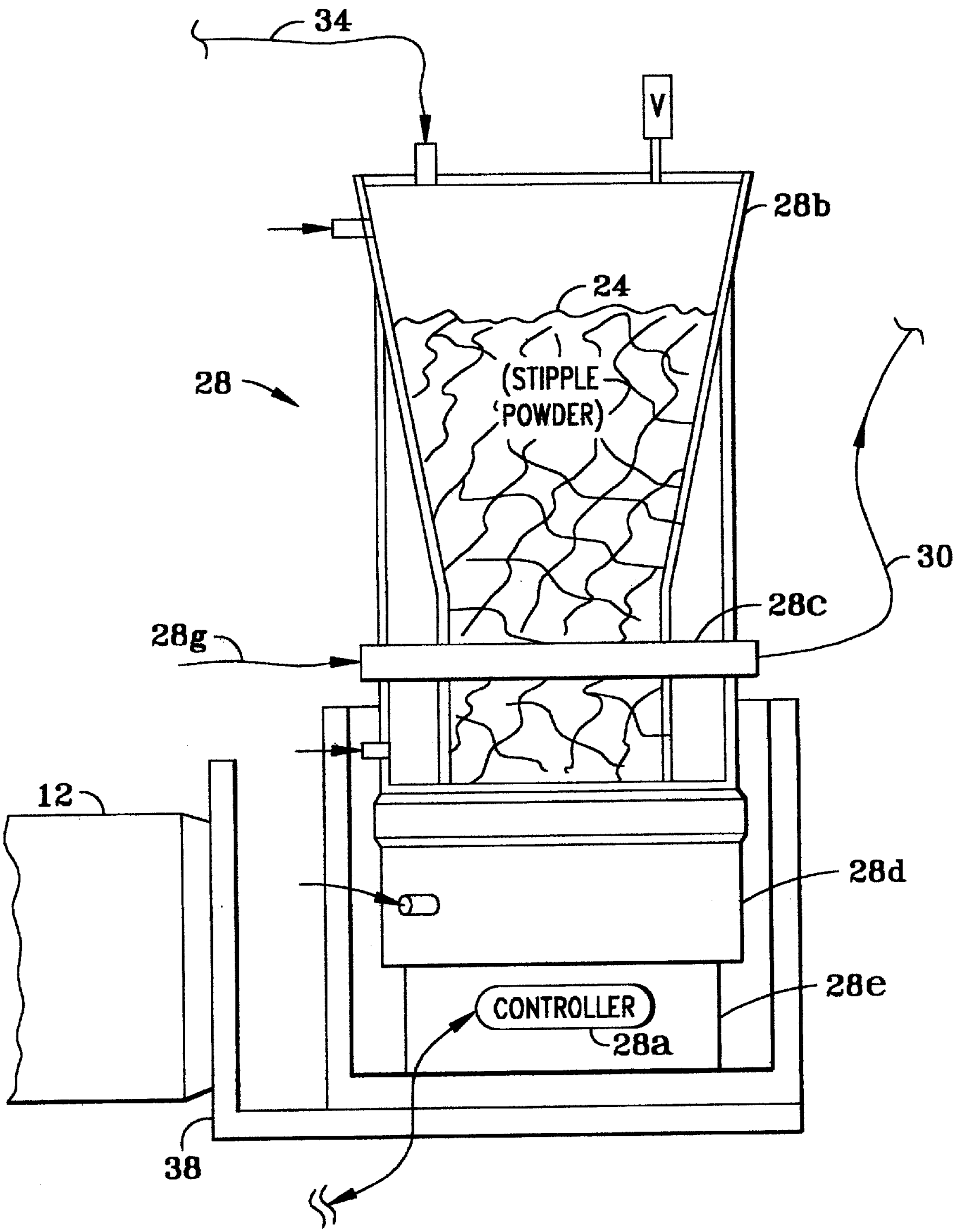
FIG. 2 is a partly sectional, elevational view of the local feeder illustrated in FIG. 1 in accordance with an exemplary embodiment.

The local feeder 28 is illustrated in more particularity in FIG. 2 in accordance with a preferred embodiment of the present invention. In this embodiment, the local feeder is in the form of a commercially available fluidized bed powder feeder 28, such a model 9MP available from Sulzer Metco Company, of Westbury, N.Y.

The local hopper 28*b* is a closed vessel in which the powder 24 is delivered from the remote conduit 34 entering through the cover thereof. The hopper is sized for storing a relatively small amount of the powder 24, up to about five pounds for example. At the bottom of the hopper is a conventional pickup shaft or tube 28*c* which receives a carrier gas 28*g*, such as nitrogen, and one end and discharges the powder in the carrier gas through the opposite end into the local conduit 30.

The hopper typically includes additional inlet ports receiving the same carrier gas to effect a fluidized bed for ensuring smooth and continuous delivery of the powder through the local conduit 30. The hopper also includes a relief valve at its cover for relieving any excess pressure of the carrier gas therein.

Disposed below the hopper is a vibratory motor 28*d* which is typically air powered for vibrating the hopper and agitating the powder for effecting smooth discharge thereof into the local conduit.

Disposed below the motor is a conventional load cell 28*e* which is configured for measuring the weight of the powder 24 contained in the hopper for controlling the feedrate thereof. The controller 28*a* includes an internal clock so that any desired feedrate may be set at the controller and effected by the feeder as the load cell measures the weight of the powder in the hopper.

As shown in FIG. 1, the process computer 36 is operatively joined through the controller 28*a* to the load cell 28*e* of the local feeder for controlling powder injection from the injector 26. Since the load cell of the local feeder 28 can accurately measure weight loss as the powder is discharged from the hopper, an accurate powder feedrate may be determined and used in a closed loop control system based on the feedback of the measured weight of the powder being discharged through the local conduit which is indicative of the feedrate thereof The process computer may be programmed to select a desired feedrate from the local feeder, with the actual feedrate being measured by the load cell therein for operating the plasma spray process in a closed feedback loop.

Alternatively, the local powder feeder may be operated in an open loop without feedback by merely setting the desired powder feedrate in the local feeder 28 without feedback of the feedrate measured by the load cell. Since the local conduit 30 is relatively short, open loop control may be sufficient for many process applications since the time lag between a change in powder feedrate at the local feeder and the feedrate delivered at the injectors is relatively short.

In the exemplary embodiment illustrated in FIG. 1, the remote or main feeder 32 is preferably a larger version of the local fluidized bed powder feeder 28 with similar components including pickup shaft 32*c*, vibratory motor 32*d*, and load cell 32*e*. The remote hopper 28*b* may be sized sufficiently large for containing a full production run of the powder 24 up to about fifty pounds, for example.

The staged powder feed system may then be operated by transferring powder from the remote feeder 32 in small batches intermittently to the local feeder 28 as the powder is depleted in the local feeder. In this way, the small batch of powder initially provided in the local hopper 28*b* may be accurately measured in weight as the powder is discharged from the feeder for accurately determining the corresponding feedrate in controlling operation of the powder injector 26 and plasma deposition of powder on the workpiece 22. Alternatively, it may be desired to continuously feed powder from the remote feeder 32 to the local feeder 28 using the corresponding load cells thereof for controlling the transfer rate therebetween.

Although the local feeder 28 preferably includes a load cell therein for measuring powder feedrate, the remote feeder 32 may have various configurations without load cells. For example, the remote feeder may alternatively be in the form of a conventional gravity feed wheel feeder 40 operatively joined to the remote conduit 34. An example of a commercially available wheel feeder is the Rotofeeder available from the Tafa Company of Concord, N.H. The wheel feeder 40 may be operated intermittently to replenish powder in the local feeder 28 as measured by the load cell thereof.

In the exemplary embodiment illustrated in FIG. 1, the machine tool attached to the distal end of the robotic arm 12 is preferably a plasma spray gun or torch 18, and the powder 24 is a plasma coating powder such as a ceramic thermal barrier coating of any conventional composition. The plasma spray deposition of thermal barrier coating is typically effected to produce a relatively constant thickness of the coating 24*c* on the workpiece 22 using a substantially constant feedrate for the powder and uniform motion of the plasma gun.

However, in view of the improved time response of the powder feedrate through the short local conduit 30, the robotic machine may now be operated by varying the feedrate of the powder discharged from the local feeder 28 through the local conduit 30 for correspondingly changing the plasma spray deposition process. For example, the varying powder feedrate may be used to accurately vary the thickness of the deposited coating 24*c* with corresponding accuracy attributable to the accurate adjustment or variation of the powder feedrate. This performance is not otherwise possible in the conventionally long powder supply conduit with correspondingly long time response.

By the simple introduction of staged powder feed attributable to the local and remote powder feeders 28,32, a significant improvement in response time for changes in powder feedrates is obtainable. This improved system may be used in various configurations to advantage wherever the accurate supply of a powder is desired in a manufacturing process. Plasma spray deposition is merely one example.

The invention may also be applied to metallic coating deposition using a high velocity oxygen fuel (HVOF) spray coating process. The invention may also be applied for metallic or plastic coatings using conventional thermal spray guns. And, the invention may also be applied for the delivery of powder filler materials in conventional welding processes.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A robotic machine comprising:

a multi-axis robotic arm having a machine tool mounted to a distal end thereof;

an injector mounted to said arm adjacent said tool for injecting powder into said machine tool;

a local powder feeder mounted to said arm, and including a local conduit joined to said injector for supplying powder thereto, and a load cell for measuring weight of said powder in said feeder to control feedrate thereof;

a remote powder feeder spaced from said arm, and including a remote conduit joined to said local feeder for supplying powder thereto; and a process computer operatively joined to said robotic arm, local feeder, and remote feeder for controlling operation thereof to supply powder to said injector in stages from said feeders in turn.

2. A machine according to claim 1 wherein:

said local feeder includes a local hopper for supplying powder to said local conduit;

said remote feeder includes a remote hopper for supplying powder to said remote conduit; and said local hopper is smaller than said remote hopper.

3. A machine according to claim 2 wherein said local conduit is shorter than said remote conduit.

4. A machine according to claim 3 wherein said local feeder is mounted vertically to a base of said arm, and said local conduit is sized to permit full multi-axis motion of said arm distal end.

5. A machine according to claim 3 wherein said process computer is operatively joined to said load cell for controlling powder injection from said injector in a closed loop based on feedback of said weight feedrate of said powder discharged through said local conduit.

6. A machine according to claim 3 wherein said process computer is operatively joined to said load cell for controlling powder injection from said injector in an open loop based on said feedrate of said powder discharged through said local conduit.

7. A machine according to claim 3 wherein said local feeder is a fluidized bed powder feeder.

8. A machine according to claim 7 wherein said remote feeder is a fluidized bed powder feeder.

9. A machine according to claim 8 wherein said remote feeder is gravity feed wheel feeder.

10. A machine according to claim 3 wherein said machine tool is a plasma spray gun, and said powder is a plasma coating powder.

11. A method of operating said robotic machine according to claim 3 comprising:

channeling said powder from said remote feeder to said local feeder in stages; and controlling said feedrate of said powder discharged from said local feeder to said injector.

12. A method according to claim 11 further comprising controlling said local feeder feedrate in closed loop by measuring weight loss from said local feeder.

13. A method according to claim 11 further comprising varying the feedrate of said powder discharged from said local feeder.

14. A method according to claim 11 further comprising transferring said powder from said remote feeder in batches to said local feeder as said powder is depleted in said local feeder.

15. A robotic machine comprising:

a multi-axis robotic arm having a machine tool mounted to a distal end thereof;

an injector mounted to said arm adjacent to said tool for injecting powder into said machine tool;

a local fluidized bed powder feeder, wherein said local feeder is mounted vertically to a base of said arm, and a local conduit is sized to permit full multi-axis motion of said arm distal end;

a remote powder feeder spaced from said arm, and including a remote conduit joined to said local feeder for supplying powder thereto; and a process computer operatively joined to said robotic arm, local feeder, and remote feeder for controlling operation thereof to supply powder to said injector in stages from said feeders in turn, wherein said process computer is operatively joined to a load cell for controlling powder injection from said injector in a closed loop based on feedback of weight feedrate of said powder discharged through said local conduit.

16. A machine according to claim 15 wherein said local conduit is shorter than said remote conduit.

17. A machine according to claim 16 wherein said local feeder includes a local hopper for supplying powder to said local conduit;

said remote feeder includes a remote hopper for supplying powder to said remote conduit; and said local hopper is smaller than said remote hopper.

18. A machine according to claim 15 wherein said machine tool is a plasma spray gun, and said powder is a plasma coating powder.

* * * * *